United States Patent
Park et al.

(10) Patent No.: US 8,290,477 B2
(45) Date of Patent: Oct. 16, 2012

(54) METHOD FOR MANAGEMENT A MULTIMEDIA DATA OF MOBILE COMMUNICATION TERMINAL AND MOBILE COMMUNICATION TERMINAL THEREFOR

(75) Inventors: Jae-Hyun Park, Hwaseong-si (KR); Eun-O Lee, Suwon-si (KR); Kang-Hoon Lee, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 426 days.

(21) Appl. No.: 12/580,705

(22) Filed: Oct. 16, 2009

(65) Prior Publication Data

US 2010/0317326 A1 Dec. 16, 2010

(30) Foreign Application Priority Data

Jun. 12, 2009 (KR) .................. 10-2009-0052528

(51) Int. Cl.
*H04M 1/725* (2006.01)

(52) U.S. Cl. .................. 455/412.1; 455/550.1; 455/466; 455/418; 709/206; 379/88.22

(58) Field of Classification Search .... 455/412.1–412.2, 455/414.1–414.4, 466, 458, 550.1; 709/203–206; 379/88.22
See application file for complete search history.

(56) References Cited

U.S. PATENT DOCUMENTS

| | | | | |
|---|---|---|---|---|
| 6,906,643 B2* | 6/2005 | Samadani et al. | ....... | 340/995.18 |
| 6,999,566 B1* | 2/2006 | Eason et al. | ............... | 379/88.22 |
| 7,283,831 B2* | 10/2007 | Caldini et al. | ................ | 455/466 |
| 7,454,195 B2* | 11/2008 | Lewis et al. | ................ | 455/412.1 |
| 7,532,913 B2* | 5/2009 | Doulton | ................... | 455/566 |
| 7,551,916 B2* | 6/2009 | Gortz et al. | ................ | 455/412.2 |
| 7,609,686 B1* | 10/2009 | McNamara et al. | .......... | 370/356 |
| 7,778,227 B2* | 8/2010 | Gibbs | ............................ | 370/338 |
| 7,779,078 B2* | 8/2010 | Bang | ............................. | 709/206 |
| 7,991,411 B2* | 8/2011 | Johnson et al. | ............... | 455/466 |
| 2004/0092250 A1* | 5/2004 | Valloppillil | ................ | 455/412.1 |
| 2005/0020246 A1 | 1/2005 | Kang | | |
| 2006/0187875 A1* | 8/2006 | Bang | ............................ | 370/328 |
| 2008/0096534 A1 | 4/2008 | Yoon | | |
| 2010/0004008 A1* | 1/2010 | Abolrous et al. | ............. | 455/466 |

FOREIGN PATENT DOCUMENTS

| | | |
|---|---|---|
| KR | 1020050011013 | 1/2005 |
| KR | 1020050083074 | 8/2005 |
| KR | 1020060040174 | 5/2006 |
| KR | 1020080035382 | 4/2008 |
| KR | 1020080067120 | 7/2008 |

* cited by examiner

*Primary Examiner* — Sharad Rampuria
(74) *Attorney, Agent, or Firm* — The Farrell Law Firm, P.C.

(57) ABSTRACT

A method is provided for managing multimedia data in a mobile communication terminal. The method includes sending a multimedia message upon a request for sending a multimedia message; deleting multimedia data attached to the multimedia message, and reconfiguring a multimedia message that includes information about a path where the attached multimedia data is stored; and storing the reconfigured multimedia message in a Sent box.

12 Claims, 6 Drawing Sheets

METHOD FOR MANAGEMENT A MULTIMEDIA DATA OF MOBILE COMMUNICATION TERMINAL AND MOBILE COMMUNICATION TERMINAL THEREFOR

PRIORITY

This application claims the priority under 35 U.S.C. §119 (a) of an application entitled "Method for Management a Multimedia Data of Mobile Communication Terminal and Mobile communication Terminal Therefor" filed in the Korean Industrial Property Office on Jun. 12, 2009 and assigned Serial No. 10-2009-0052528, the contents of which are hereby incorporated by reference.

BACKGROUND OF THE INVENTION

1. Field of the Invention

The present invention relates generally to a mobile communication terminal, and more particularly, to a method for managing multimedia data in a mobile communication terminal and a mobile communication terminal therefor.

2. Description of the Related Art

In line with the commercialization of mobile communication terminals, the mobile terminals have a variety of additional functions as well as the basic call function. Many popular functions among the additional functions, such as a photographing function based on a digital camera, a music playback function, and a video playback function, have been provided in the mobile communication terminals. Accordingly, the mobile communication terminals can support a Multimedia Messaging Service (MMS) that sends and receives as contents associated with the above additional functions as messages.

MMS is a wireless data communication scheme in the form of a wireless mail system that $3^{rd}$ Generation Partnership Project (3GPP) has established to support Person-to-Person delivery of multimedia messages in the $3^{rd}$ Generation (3G) wireless Internet environments. The MMS provides a wireless multimedia message service method extended to wire/wireless networks, so as to deliver and output every kind of media, including text, audio, image and video, to MMS agents. Thus, contents contained in multimedia messages that are sent/received using MMS may include text, image, video, sound source, etc. In the following description, every content-related data that is included in multimedia messages and delivered by MMS will be called 'multimedia data.'

Generally, in order for a mobile communication terminal to send a multimedia message using MMS, a sending mobile communication terminal first composes a multimedia message with multimedia data attached, and sends the composed multimedia message.

After the sending mobile communication terminal sends the multimedia message, the sent multimedia message is automatically stored in a Sent box (or a Sent Message box) in the sending terminal.

In most cases, the multimedia data attached to the multimedia message stored in the Sent box may be a copy of the multimedia data previously stored in a memory of the mobile communication terminal. The multimedia data is large in capacity compared with text messages of the mobile communication terminal, because it generally includes an image or video data. Therefore, if many multimedia messages are stored in the Sent box, they may occupy a large amount of storage in the mobile communication terminal, causing unnecessary waste of the storage due to the duplicate multimedia data.

SUMMARY OF THE INVENTION

An aspect of the present invention provides a multimedia data management method capable of reducing unnecessary waste of storage due to multimedia messages stored in a Sent box in a mobile communication terminal, and a mobile communication terminal therefor.

According to one aspect of the present invention, there is provided a method for managing multimedia data in a mobile communication terminal. The method includes sending a multimedia message upon a request for sending a multimedia message; deleting multimedia data attached to the multimedia message, and reconfiguring a multimedia message that includes information about a path where the attached multimedia data is stored; and storing the reconfigured multimedia message in a Sent box.

According to another aspect of the present invention, there is provided a mobile communication terminal for managing multimedia data. The mobile communication terminal includes a display device for displaying image information; a memory for storing multimedia data; and a controller for sending a multimedia message upon a request for sending a multimedia message, deleting multimedia data attached to the multimedia message, reconfiguring a multimedia message that includes information about a path where the attached multimedia data is stored, and storing the reconfigured multimedia message in a Sent box.

BRIEF DESCRIPTION OF THE DRAWINGS

The above and other aspects, features and advantages of certain exemplary embodiments of the present invention will be more apparent from the following description taken in conjunction with the accompanying drawings, in which.

DETAILED DESCRIPTION OF EXEMPLARY EMBODIMENTS

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The present invention provides a method for replacing multimedia data attached to a multimedia message stored in a Sent box with path information of the actual multimedia data when sending the multimedia message in a mobile communication terminal, thereby reducing the capacity of multimedia messages stored in the Sent box. In addition, the present invention provides a multimedia data management method and terminal for, when deleting multimedia data stored in the terminal, informing a user that the multimedia data has ever been attached to a multimedia message, if there is a multimedia message in a Sent box, which makes reference to a path of the multimedia data to be deleted. A detailed description thereof will be made below with reference to accompanying drawings.

Figure 1:
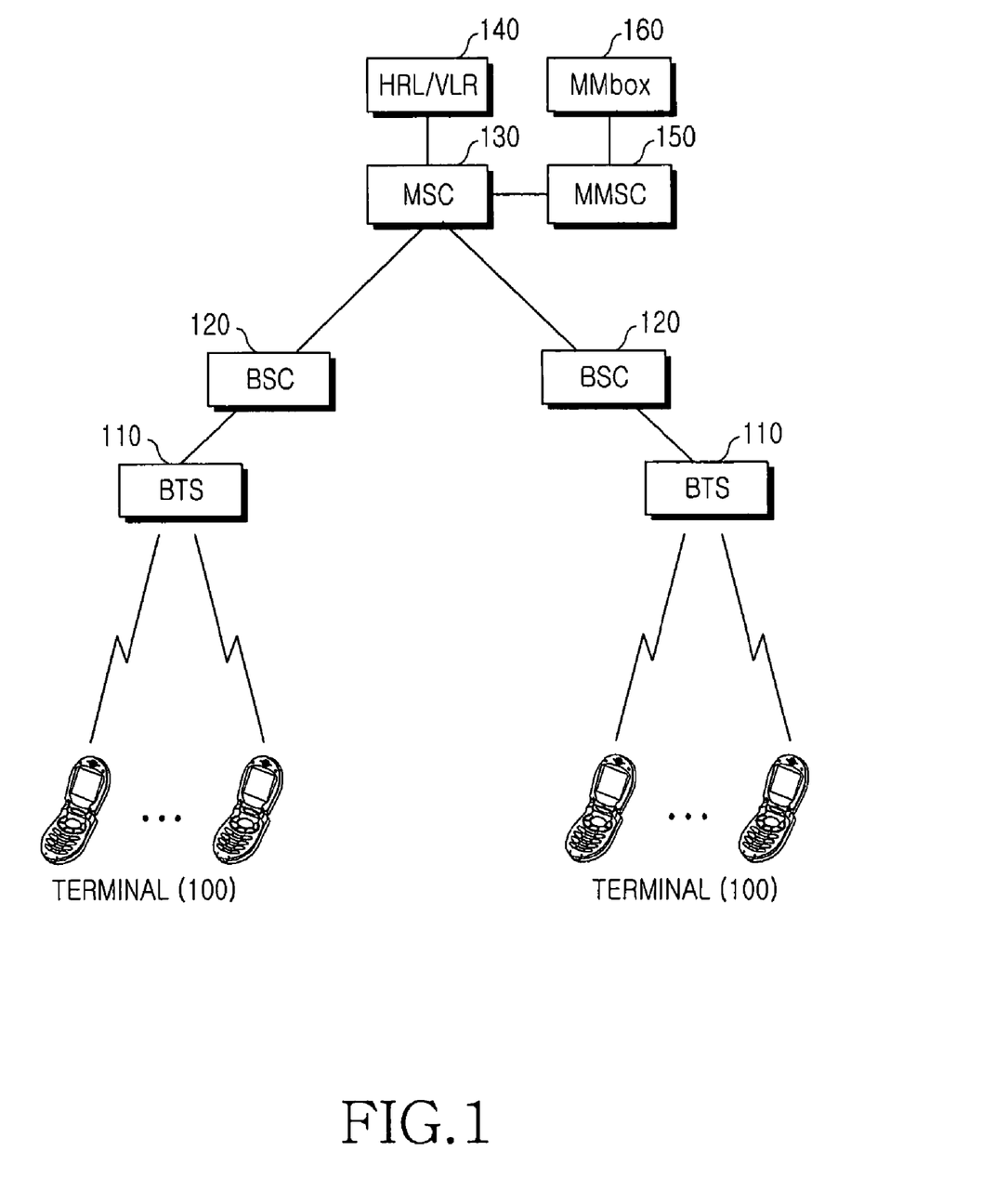
FIG. 1 is a block diagram of a mobile communication system to which the present invention is applicable.

FIG. 1 is a block diagram of a mobile communication system to which the present invention is applicable. A configuration of the mobile communication system will be described with reference to FIG. 1. Referring to FIG. 1, the mobile communication system includes mobile communication terminals 100, Base Transceiver Stations (BTSs) 110, Base Station Controllers (BSCs) 120, a Mobile Switching Center (MSC) 130, a Home Location Register/Visitor Location Register (HLR/VLR) 140, a Multimedia Messaging Service Center (MMSC) 150, and a Multimedia Message box (MM box) 160.

The BTSs 110 communicate with the mobile communication terminals 100 in the wireless section.

The BSCs 120 control wireless and wire links, perform a handoff function for keeping continuity of a call even during subscriber's movement, and transmit location data and status data of mobile communication terminals 100 received from the BTSs 110 to the MSC 130.

The MSC 130 performs network interworking with other MSCs and inquires of the HLR/VLR 140 about subscribers in order to handle incoming/outgoing call requests from the mobile communication terminals 100. The MSC 130 stores location registration-related status data and location information received from the BSCs 120 in the HLR/VLR 140.

The HLR/VLR 140 is a middle-sized computer that mainly serves as a subscriber information processing device.

The MM box 160, a high-capacity service server, is a multimedia message store server that stores multimedia messages sent from subscribers. The subscribers may store and delete multimedia messages in/from the MM box 160, and whenever necessary, may download stored multimedia messages or send the multimedia messages to other mobile communication terminals or a multimedia service server. The multimedia service server is a high-capacity service server, which provides various services using MMS. Management of multimedia messages stored in the MM box 160, such as storing, deleting and sending multimedia messages of subscribers, is carried out by the MMSC 150.

The mobile communication terminals 100 communicate with the BTSs 110 in the wireless section, and perform a variety of communication services provided in the mobile communication system. The mobile communication terminals 100 perform MMS, and reconfigure sent multimedia messages and store the reconfigured multimedia messages in a Sent box, according to features of the present invention. The sent multimedia messages are reconfigured by including information about a path of multimedia data in place of the multimedia data attached to the multimedia messages.

Figure 2:
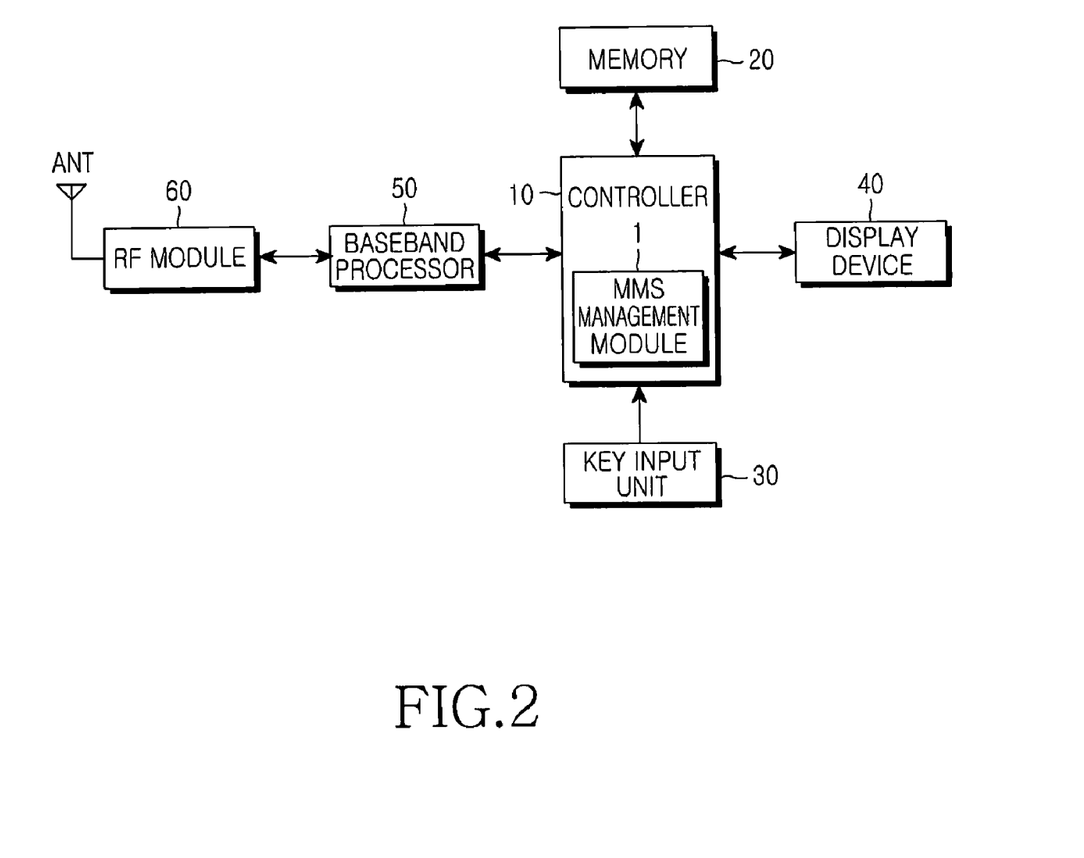
FIG. 2 is a block diagram of a mobile communication terminal to which the present invention is applicable.

A structure of the mobile communication terminal is illustrated in FIG. 2. FIG. 2 is a block diagram of a mobile communication terminal to which the present invention is applicable. Referring to FIG. 2, a mobile communication terminal 100 includes a controller 10, a memory 20, a key input unit 30, a display device 40, a baseband processor 50, and a Radio Frequency (RF) module 60.

The key input unit 30 includes numeric keys of 0~9, a '*' key, a '#' key, direction keys, and a plurality of function keys, such as a Menu key, a Select key, a Send key, a Delete key, a Power/End key and a Volume key that are provided to correspond to a variety of functions provided by the mobile communication terminal. The key input unit 30 provides key input data corresponding to keys pressed by the user, to the controller 10.

The display device 40 displays a variety of image information and data information that is received from a BTS or stored in the memory 20, on a screen under the control of the controller 10. In a process of deleting multimedia data, if the multimedia data is data that has ever been attached to a multimedia message, the display device 40 according to an embodiment of the present invention displays information (or a comment) indicating that the multimedia data to be deleted is data that has ever been attached to a multimedia message. If such a multimedia message exists in the Sent box, the display device 40 displays information indicating that a message linked to the multimedia data to be deleted exists in the Sent box. At the same time, the display device 40 displays information indicating whether to delete the multimedia message existing in the Sent box.

The RF module 60, which exchanges radio signals with the BTS via an antenna, modulates a transmission signal received from the controller 10 through the baseband processor 50, transmits the modulated RF signal via the antenna, demodulates an RF signal received via the antenna, and provides the demodulated RF signal to the controller 10 through the baseband processor 50. The baseband processor 50 processes baseband signals exchanged between the RF module 60 and the controller 10.

The memory 20 stores processing and control programs for the controller 10, reference data, various updatable storage data, and various kinds of multimedia data, and is provided as a working memory of the controller 10. The multimedia data is data for the content that is carried on a multimedia message during MMS, and can be, for example, sound source data, video data, image data and text data. The memory 20, which stores program data that is needed during an MMS operation according to the present invention, may include built-in memory basically mounted in the mobile communication terminal 100 and an external memory that can be inserted into the mobile communication terminal 100. The built-in memory may be determined according to the type of the mobile communication terminal 100.

The memory 20 according to an embodiment of the present invention has a Sent box in which multimedia messages sent by the mobile communication terminal 100 are stored after being reconfigured. The memory 20 may separately store a list of multimedia data attached to the sent multimedia messages.

The controller 10, which includes an MMS management module 1, processes the overall function of the mobile communication terminal, including a call function, a data communication function, and additional functions in the mobile communication terminal. The MMS management module 1 takes charge of the general control operation performed during MMS. In accordance with an embodiment of the present invention, when sending a multimedia message, the MMS management module 1 reconfigures a multimedia message including path information of particular multimedia data instead of the particular multimedia data attached to the sent multimedia message, and stores the reconfigured multimedia message in the Sent box. If the mobile communication terminal 100 is set so as not to store in the Sent box the messages sent during message sending, the reconfiguration operation is not performed and the sent message is immediately deleted.

When the user checks the Sent box, the controller 10 outputs data located in a relevant path based on path information of multimedia data included in the multimedia message stored in the Sent box. When the user requests deletion of multimedia data, the controller 10 determines whether the multimedia data to be deleted is data linked to the multimedia data attached to multimedia messages stored in the Sent box. If so, the controller 10 displays a comment indicating the existence of a linked message in the Sent box. In addition, if the multimedia data to be deleted exists in a preset Sent-multimedia data list, the controller 10 displays a comment indicating that it is multimedia data that has ever been attached to a sent multimedia message.

Figure 3:
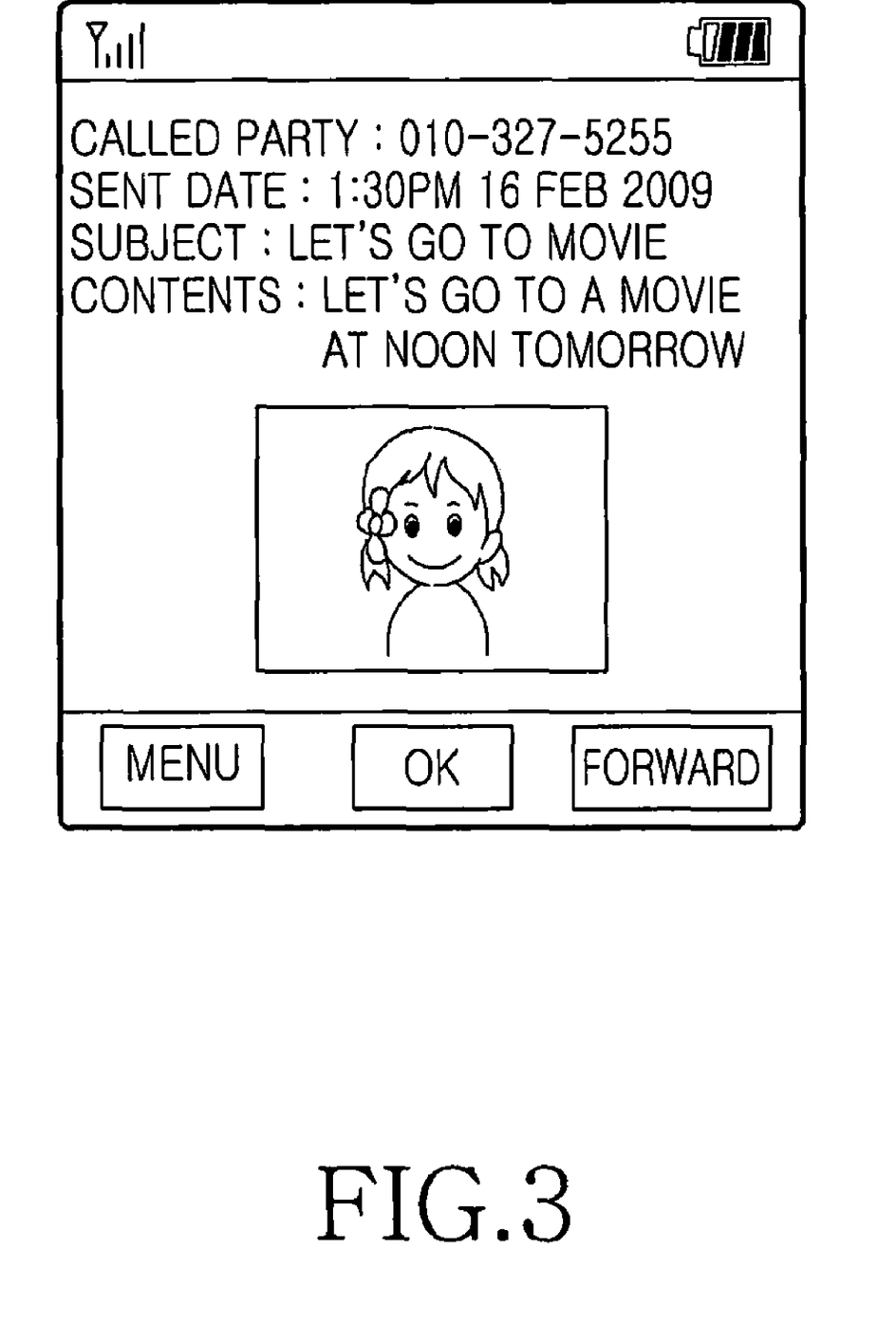
FIG. 3 is a diagram illustrating a display on which a user checks a multimedia message in a Sent box of a mobile communication terminal.

FIG. 3 illustrates a display on which a user checks a multimedia message in a Sent box of a mobile communication terminal. As shown in FIG. 3, when a user checks a multimedia message in the Sent box, the controller 10 outputs and displays multimedia data located in path information stored in the multimedia message. Although the present invention reduces capacity of the Sent box by deleting multimedia data attached to multimedia messages stored in the Sent box, the user may read the multimedia data in the existing method when checking the Sent box.

Figure 4:
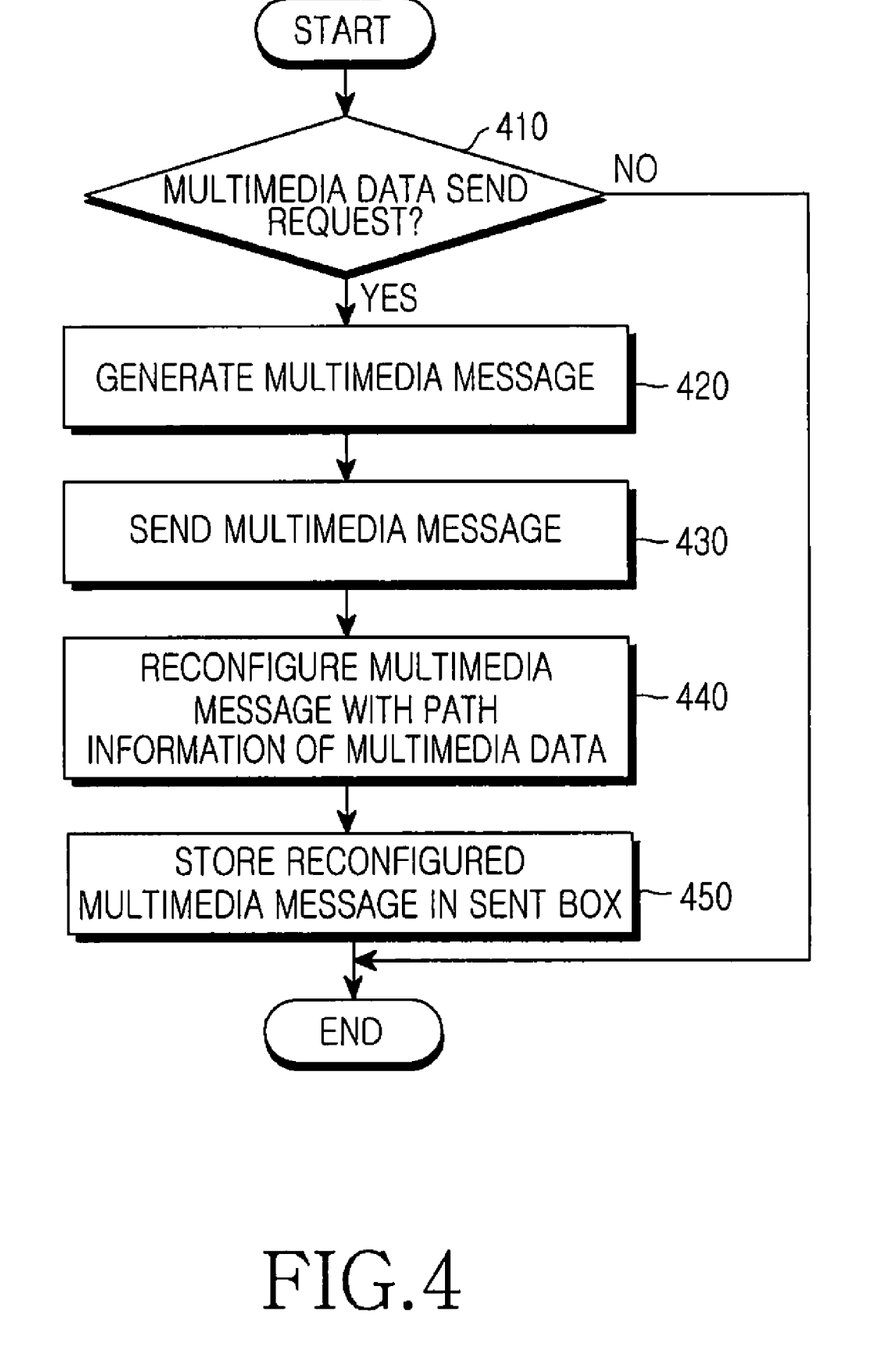
FIG. 4 is a flowchart illustrating an operation of sending a multimedia message in a mobile communication terminal according to an embodiment of the present invention.

FIG. 4 illustrates an operation of sending a multimedia message in a mobile communication terminal according to an embodiment of the present invention.

Referring to FIG. 4, if a request for sending multimedia data occurs in a mobile communication terminal 100 in step 410, the mobile communication terminal 100 generates a multimedia message in step 420. In this case, the mobile communication terminal 100 generates a multimedia message by attaching the multimedia data to be sent.

In step 430, the mobile communication terminal 100 sends the multimedia message to a receiving terminal.

In step 440, in order to store the sent multimedia message in a Sent box, an MM manage module 1 in a controller 10 of the mobile communication terminal 100 reconfigures a multimedia message that includes path information of the multimedia data, instead of the multimedia data.

In step 450, the mobile communication terminal 100 stores the reconfigured multimedia message in the Sent box and then ends the operation. If the sent multimedia data is managed in a separate list-type file, the mobile communication terminal 100 updates a preset Sent-multimedia data list by additionally storing information about the multimedia data included in the currently sent multimedia message in the Sent-multimedia data list.

Figure 5:
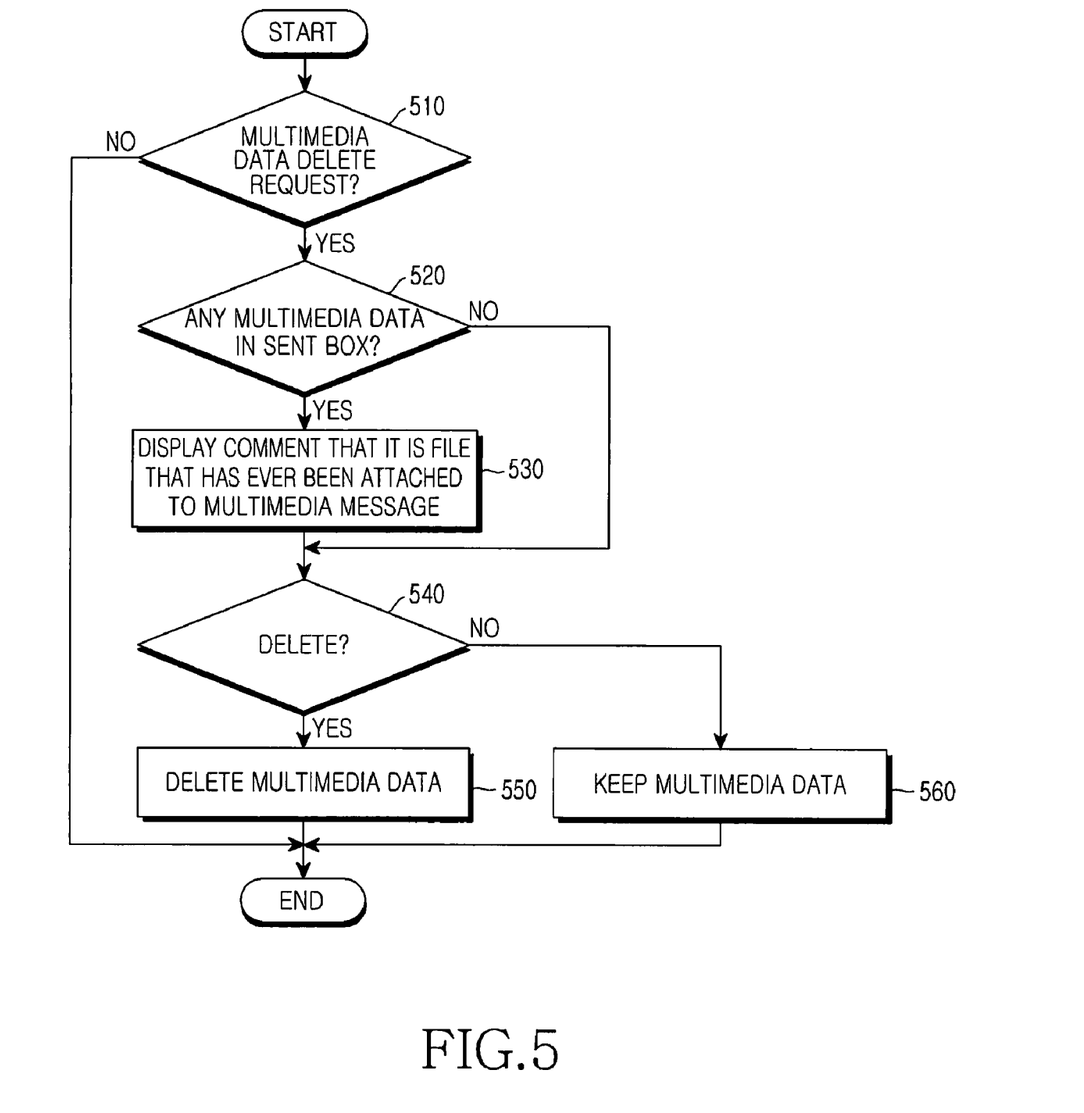
FIG. 5 is a flowchart illustrating an operation of deleting multimedia data in a mobile communication terminal according to an embodiment of the present invention.

FIG. 5 illustrates an operation of deleting multimedia data in a mobile communication terminal according to an embodiment of the present invention.

Referring to FIG. 5, if deletion of multimedia data is requested in step 510, it is determined in step 520 whether the deletion-requested multimedia data exists in a Sent-multimedia data list. In other words, it is determined whether any of the multimedia messages stored in the Sent box includes path information of the deletion-requested multimedia data. If a separate preset Sent-multimedia data list is managed, it is determined whether the deletion-requested multimedia data exists in the list. If the deletion-requested multimedia data exists in the list, the operation proceeds to step 530. Otherwise, the operation proceeds to step 540.

In step 530, a window is displayed indicating that data linked to the multimedia data to be deleted exists in the Sent box, or a window is displayed indicating that the multimedia data to be deleted is data that has ever been attached to the multimedia message. The exemplary displaying in step 530 is shown in FIGS. 6A and 6B.

Figure 6A:
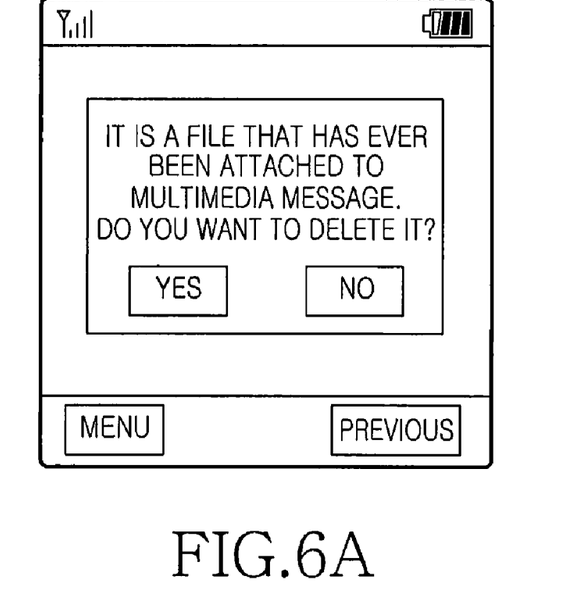
FIGS. 6A and 6B are diagrams illustrating displays on which a user determines whether to delete multimedia data attached to a multimedia message in a mobile communication terminal according to an embodiment of the present invention.
Figure 6B:
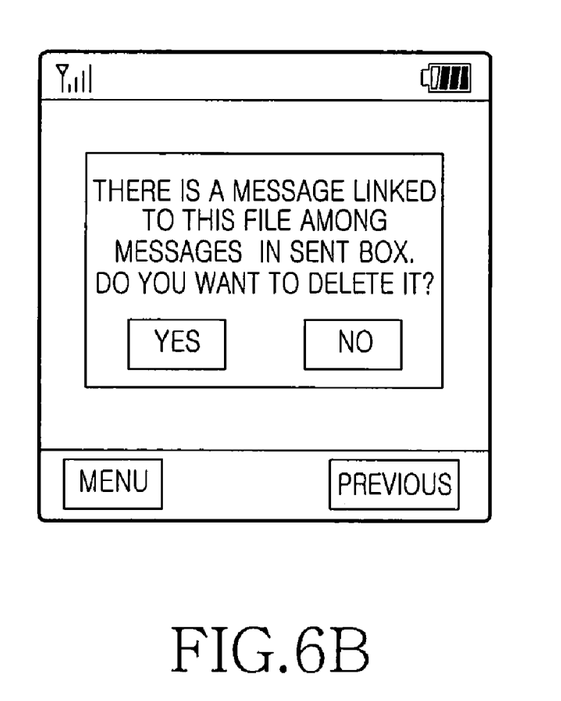

FIGS. 6A and 6B illustrate displays on which a user determines whether to delete multimedia data attached to a multimedia message in a mobile communication terminal according to an embodiment of the present invention. FIG. 6A shows an example of a comment displayed on a screen when the deletion-requested multimedia data exists in the Sent-multimedia data list, and FIG. 6B shows an example of a comment displayed on a screen when the deletion-requested multimedia data is data linked to the multimedia data included in a multimedia message stored in the Sent box.

In step 540, it is determined whether to delete the multimedia data by displaying a screen asking the user to determine whether to delete the multimedia data. In this case, it is possible to display the screen asking the user to determine whether to delete the multimedia data, while displaying information indicating that the multimedia data to be deleted is data that has ever been attached to the multimedia message as in 530 of FIG. 6A. If the multimedia data to be deleted has nothing to do with the multimedia message, a window can be displayed, which asks the user to simply determine whether to delete the multimedia data.

When the multimedia data to be deleted is linked to a message in the Sent box, a window can be displayed, which asks the user to determine whether to delete the linked message in the Sent box together. If it is determined to delete the linked message together, the linked message in the Sent box can be deleted together with the multimedia data.

If 'deletion' is determined in step 540, the multimedia data is deleted in step 550. If 'no-deletion' is determined in step 540, the multimedia data is kept in step 560.

As is apparent from the foregoing description, when storing a multimedia message in a Sent box after sending the multimedia message, exemplary embodiments of the present invention may reconfigure a multimedia message by replacing multimedia data attached to the multimedia message with path information of the multimedia data, and store the reconfigured multimedia message in the Sent box, thereby reducing unnecessary waste of storage due to a copy of the multimedia data attached to the multimedia message stored in the Sent box in the mobile communication terminal. During deletion of multimedia data, if the multimedia data is a file that has ever been attached to a multimedia message, the present invention informs the user that it is a file that has ever been attached to the multimedia message, preventing a loss of important data. Also, during the deletion of multimedia data, if there is a multimedia message that is linked to the multimedia data and stored in the Sent box, the present invention asks the user to determine whether to delete the multimedia message, thereby reducing unnecessary resource waste.

Operation and structure of a method for managing multimedia data in a mobile communication terminal and a mobile communication terminal therefor according to an embodiment of the present invention can be achieved as described above. While the invention has been shown and described with reference to certain exemplary embodiments thereof, it will be understood by those skilled in the art that various changes in form and details may be made therein without departing from the spirit and scope of the invention as defined by the appended claims and their equivalents.

Although, during deletion of multimedia data, the present invention checks the Sent box or the preset Sent-multimedia data list and displays the check results, regarding multimedia data attached a multimedia message, it is also possible to insert such information in the multimedia data and allow a user to check it during deletion request. For example, if multimedia data is transmitted on MMS, a tag is inserted in the transmitted multimedia data, indicating that the multimedia data is attached to MMS. Thereafter, upon a delete request for multimedia data, it is possible to check the tag in the multimedia data and inform the user whether the multimedia data is attached to a multimedia message.

What is claimed is:

1. A method for managing multimedia data in a mobile communication terminal, comprising:
    sending a multimedia message upon a request for sending a multimedia message;
    deleting multimedia data attached to the multimedia message, and reconfiguring a multimedia message that includes information about a path indicating a location where the attached multimedia data is stored in the mobile communication terminal; and
    storing the reconfigured multimedia message in a Sent box.

2. The method of claim 1, further comprising, when checking a multimedia message stored in the Sent box, outputting multimedia data corresponding to a path of multimedia data included in the multimedia message stored in the Sent box.

3. The method of claim 1, further comprising:
    when deleting particular multimedia data in the mobile communication terminal, determining whether a multimedia message storing a path of the multimedia data to be deleted exists in the Sent box; and
    when a multimedia message storing a path of the multimedia data to be deleted exists in the Sent box, displaying information indicating the existence of a multimedia message linked to the multimedia data to be deleted among messages in the Sent box.

4. The method of claim 3, wherein the displaying comprises displaying information indicating the existence of a multimedia message linked to the multimedia data to be deleted among messages in the Sent box, and displaying information indicating whether to delete the multimedia message linked to the multimedia data to be deleted.

5. The method of claim 1, further comprising storing information about multimedia data included in the sent multimedia message in a preset Sent-multimedia data list.

6. The method of claim 5, further comprising:
    when deleting particular multimedia data in the mobile communication terminal, determining whether information about the multimedia data to be deleted is stored in the Sent-multimedia data list; and
    when information about the multimedia data to be deleted is stored in the Sent-multimedia data list, displaying information indicating that the multimedia data is a file that has ever been attached to a multimedia message.

7. A mobile communication terminal for managing multimedia data, comprising:
    a display device for displaying image information;
    a memory for storing multimedia data; and
    a controller for sending a multimedia message upon a request for sending a multimedia message, deleting multimedia data attached to the multimedia message, reconfiguring a multimedia message that includes information about a path indicating a location where the attached multimedia data is stored in the memory, and storing the reconfigured multimedia message in a Sent box.

8. The mobile communication terminal of claim 7, wherein upon a request for checking a multimedia message stored in the Sent box, the controller outputs multimedia data corresponding to a path of multimedia data included in the multimedia message stored in the Sent box.

9. The mobile communication terminal of claim 7, wherein upon a request for deleting particular multimedia data in the mobile communication terminal, the controller determines whether a multimedia message storing a path of the multimedia data to be deleted exists in the Sent box, and when a multimedia message storing a path of the multimedia data to be deleted exists in the Sent box, displays, on the display device, information indicating the existence of a multimedia message linked to the multimedia data to be deleted among messages in the Sent box.

10. The mobile communication terminal of claim 9, wherein the displaying comprises displaying information indicating the existence of a multimedia message linked to the multimedia data to be deleted among messages in the Sent box, and displaying information indicating whether to delete the multimedia message linked to the multimedia data to be deleted.

11. The mobile communication terminal of claim 7, wherein the controller stores information about multimedia data included in the sent multimedia message in a preset Sent-multimedia data list.

12. The mobile communication terminal of claim 11, wherein upon a request for deleting particular multimedia data in the mobile communication terminal, the controller determines whether information about the multimedia data to be deleted is stored in the Sent-multimedia data list, and displays information indicating that the multimedia data is a file that has ever been attached to a multimedia message, when information about the multimedia data to be deleted is stored in the Sent-multimedia data list.

* * * * *